Figure 1:
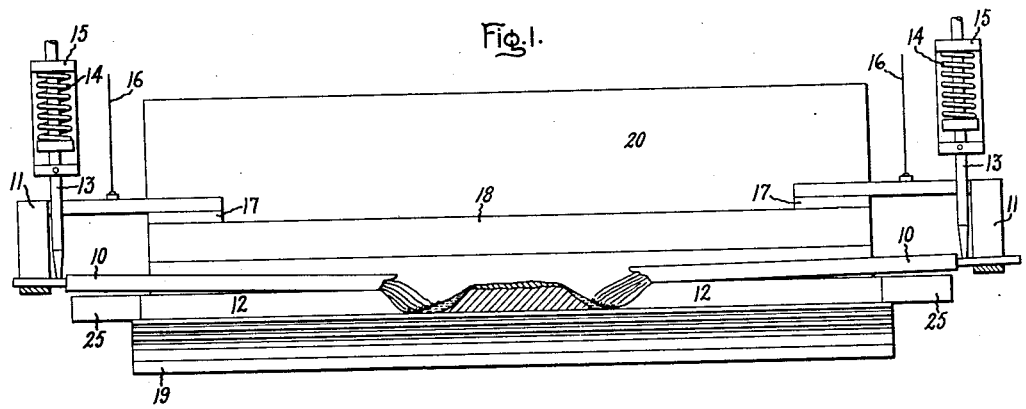

Feb. 7, 1939.    G. G. SOMERVILLE    2,146,601
ARC WELDING APPARATUS
Original Filed Oct. 23, 1936

Inventor:
Gareth G. Somerville,
by Harry E. Dunham
His Attorney.

Patented Feb. 7, 1939

2,146,601

UNITED STATES PATENT OFFICE 2,146,601

ARC WELDING APPARATUS

Gareth G. Somerville, Pittsfield, Mass., assignor to General Electric Company, a corporation of New York Original application October 23, 1936, Serial No. 107,185. Divided and this application May 18, 1937, Serial No. 143,315

4 Claims. (Cl. 219—8)

My invention relates to arc welding and more particularly to that type of arc welding in which the welding operation proceeds automatically in accordance with the consumption of an electrode which is applied to the work parallel to the line of welding with its end in arcing engagement with the work. For convenience, this type of arc welding is often referred to as "self-operating" in view of the fact that the welding operation proceeds automatically once the welding arc has been started at the end of the electrode and the electrode has been properly positioned along the line of welding.

When employing the self-operating process of welding, the welding current is supplied through the electrode. Heretofore unless the welding current was supplied to the arc through a comparatively long length of electrode it was not possible to employ the process for welding seams of great length if a substantially uniform continuous weld was required. The welding electrode employed is usually provided with a flux coating which not only positions the electrode within arcing distance of the work, but also serves to control the welding arc and provides when fused a slag covering which protects the weld from the surrounding atmosphere and improves the quality of the deposited metal. When using a flux coated electrode of considerable length the supply of current through the electrode generates sufficient heat to disintegrate the flux coating and to interfere consequently with the successful performance of the self-operating process of welding.

I have discovered that a uniform weld of great length may be made with the self-operating process of welding by positioning on the work along the line of welding two electrodes the adjacent inner ends of which are within arcing distance of one another and the outer ends of which are connected to a source of welding current of sufficient voltage to maintain two arcs in series with one another and then initiating the welding operation by striking an arc between the adjacent inner ends of these electrodes. This initiating arc with the consumption of the electrodes drops to the work and divides into two series connected arcs which move away from one another along the line of welding as the electrodes are consumed. Due to the action of the arcs upon the work no crater is formed in the work at the point of starting. Each arc directs molten weld metal toward the other and produces at the point of starting a uniform weld which extends in each direction from the point of starting. It is apparent that by using two electrodes to form a single continuous weld in accordance with my discovery that the length of a continuous weld obtainable when using the self-operating process of welding is twice that of the electrodes used and is obtained at twice the welding speed obtainable with heretofore proposed methods of welding with the self-operating process. By using a polyphase source of current which is connected to a plurality of electrodes which are simultaneously consumed by a plurality of pairs of series connected arcs, it is possible to obtain still greater speeds of welding. By resorting to particular electrode connections it is possible to obtain with a polyphase source of current welds of uniform quality the total length of which is the combined lengths of the electrodes which are connected to the polyphase source of supply.

The above-referred-to procedures of welding by the self-operating process are disclosed and claimed in my application Serial No. 107,185 for Arc welding, filed October 23, 1936, which also describes certain apparatus by means of which these procedures are carried into effect.

Figure 2:
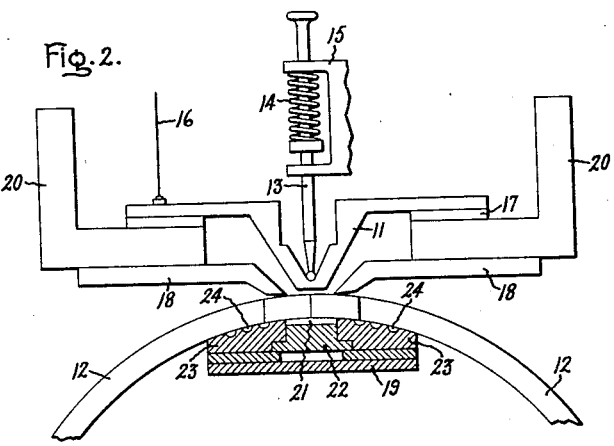

The subject matter claimed herein has been divided from this above-referred-to application and resides in the constructions illustrated in Figs. 1 and 2 taken from this above-referred-to application.

In Figs. 1 and 2 of the drawing I have diagrammatically illustrated a welding machine capable of performing welding operations where the length of the weld is twice the length of the electrodes used. In these figures two flux coated electrodes 10 are supported with their bared end portions resting on electrode holders 11 which are offset from the work 12 and slightly elevated above its surface. The flux coated portion of the electrodes is biased into arcing engagement with the work by plungers 13 which engage the electrodes at points between the electrode holders and the work. These plungers are forced into engagement with the electrodes through the agency of springs 14 reacting on supports 15 which form a part of the frame structure of the welding machine. The electrode holders are formed of electrically conductive material and each is connected to a terminal 16 of a source of welding current which must be of sufficient voltage to maintain two series connected arcs with the desired flow of welding current. The electrode holders 11 are electrically insulated from the frame structure of the machine by insulating members 17 positioned between these holders and the frame structure of the machine.

In Fig. 1 of the drawing the behavior of the welding arcs and the flow of weld metal has been indicated. It will be noted that no crater is formed at the point where the welding operation was initiated between the inner adjacent ends of the electrode. It will also be noted that the flux coating on each electrode forms a hood over the arc which directs the arc downward and to a great extent prevents the spatter of electrode material. A hood of the character illustrated is obtained by using an electrode having an eccentric flux coating which is placed on the work with the thinner portion of the coating against the work. The same result may be obtained by the use of a flux coating next to the work that is consumed at a greater rate than the flux coating located more remotely from the work.

I have also discovered that it is possible to control the width of the weld and its penetration into the work by the use of cupreous bars having work engaging portions of restricted section forming dams for the deposited metal on each side of the electrode and by the use of a grooved backing member having a work engaging surface of low heat conductivity.

In Figs. 1 and 2 of the drawing the cupreous bars are shown at 18 and the grooved backing member at 19. The bars 18 are attached to supports 20 which also act as supports for the electrode holders 13. These bars have edged portions of restricted section which engage the work at opposite sides of the electrodes and constitute dams for holding in place on the work the weld metal deposited from the electrodes and melted from the work. These bars also limit the activity of the arc in a lateral direction thus controlling its penetrating qualities. By controlling the distance the work engaging portions of these bars are spaced from one another, it is possible to obtain welds of desired width and penetration.

The action of these bars is assisted by the use of the grooved backing member 19 which is located with its grooved portion 21 on the other side of the work below the welding electrodes. The bottom of the grooved portion may be formed by a copper bar 22 which is supported between the work engaging surface portions 23 of the bar. These work engaging surface portions are made of low heat conductivity by providing them with a plurality of grooves 24 which greatly limit the surface area of the backing member in engagement with the work. With this construction it is apparent that most of the heat must travel from the arc through the work parts instead of passing from the work parts into the backing member. It is because of this restricted heat transfer to the backing member that the degree of penetration of the weld into the work is effectively controlled.

The relative sizes of electrodes, work and clamping bars have been distorted in the drawing for purposes of illustrating the behavior of the welding arcs on the weld metal. I have found that the following spacings of the dams for different electrode sizes and plate thicknesses give the best results.

| Plate thickness in inches | Electrode diameter in inches | Spacing of dam edges in inches |
| --- | --- | --- |
| 1/8 | 3/16, 1/4 | 3/8, 9/16 |
| 1/4 | 1/4, 5/16 | 9/16, 9/16–5/8 |
| 1/2 | 5/16, 3/8 | 5/8, 5/8 |

In order to prevent the formation of craters at the outer ends of the weld, strips of metal 25 may be attached at each end at the line of welding, and the welding operation interrupted after the welding arcs have traveled on to these strips which are subsequently broken from the work.

In view of the description of my invention above given it is apparent to those skilled in the art that various modifications other than those illustrated may be employed without departing from the spirit and scope thereof and I consequently intend to cover in the appended claims all those modifications of my invention which fall within the true spirit and scope thereof.

What I claim as new and desire to secure by Letters Patent of the United States is:

1. Apparatus for performing welding operations wherein the side of a welding electrode is applied to the work within arcing distance thereof and substantially parallel to the line of welding, comprising an electrically conductive electrode support, a source of supply connected to said support, and means between said support and the work for holding an electrode in electrically conductive engagement with said support and for biasing its arcing terminal portion into arcing engagement with the work.

2. Apparatus for performing welding operations wherein the side of a flux coated welding electrode is applied to the work substantially parallel to the line of welding, comprising an electrically conductive electrode holder laterally offset from the work and slightly elevated above the surface of the work, means between said electrode holder and the work for holding the bared end portion of a flux coated electrode in electrically conductive engagement with said holder and for biasing the flux coated portion thereof into arcing engagement with the work, and means for supplying welding current to said electrode holder.

3. Apparatus for performing welding operations wherein the side of a flux coated welding electrode is applied to the work substantially parallel to the line of welding, comprising an electrically conductive electrode holder laterally offset from the work and slightly elevated above the surface of the work, means between said electrode holder and the work for holding the bared end portion of a flux coated electrode in electrically conductive engagement with said holder and for biasing the flux coated portion thereof into arcing engagement with the work, means for controlling the width and degree of penetration of the weld, said means including cupreous bars having work engaging edge portions of restricted section forming dams for the deposited weld metal and a grooved backing member having a work engaging surface of low heat conductivity, and means for holding the edge portions of said bars in engagement with one side of the work in spaced relationship to said electrode supported in said holder and for holding said backing member in engagement with the other side of the work with its grooved portion opposite the welding electrode.

4. Apparatus for controlling the width and degree of penetration of a weld formed by an arc welding operation comprising a plurality of cupreous bars having work engaging portions of restricted section forming dams for the deposited weld metal, a grooved backing member having a work engaging surface of low heat conductivity, means for holding said work engaging portions of said bars in engagement with one side of the work on opposite sides of the seam to be welded and in spaced relationship to one another, and means for holding said backing member in engagement with the other side of the work with its grooved portion opposite said seam.

GARETH G. SOMERVILLE.